US007917927B1

(12) United States Patent
Morrison et al.

(10) Patent No.: US 7,917,927 B1
(45) Date of Patent: Mar. 29, 2011

(54) METHOD FOR SELECTING A PROGRAM DISPLAYED IN AN ADVERTISEMENT IN AN APPLICATION SOFTWARE PROGRAM

(75) Inventors: Hugh Boyd Morrison, Indianapolis, IN (US); Anthony Edward Stuart, Indianapolis, IN (US); Robert Joseph Logan, Indianapolis, IN (US); Charles Bryan Hunt, Westfield, IN (US); Megan Louise Brown, Carmel, IN (US); Jill Suzanne Allen, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/868,254

(22) PCT Filed: Dec. 22, 1999

(86) PCT No.: PCT/US99/30761
§ 371 (c)(1),
(2), (4) Date: May 15, 2001

(87) PCT Pub. No.: WO00/40015
PCT Pub. Date: Jul. 6, 2000

Related U.S. Application Data (60) Provisional application No. 60/114,077, filed on Dec. 28, 1998.

(30) Foreign Application Priority Data

Dec. 22, 1999 (WO) .................. PCT/US99/30761

(51) Int. Cl.
*H04N 5/445* (2006.01)
*H04N 7/173* (2006.01)
*G06F 3/00* (2006.01)

(52) U.S. Cl. .............. 725/43; 725/42; 725/47; 725/113; 715/783; 715/718

(58) Field of Classification Search .................... 725/58, 725/42, 32–34, 43, 112, 113
See application file for complete search history.

(56) References Cited

U.S. PATENT DOCUMENTS 5,410,326 A     4/1995   Goldstein
(Continued)

FOREIGN PATENT DOCUMENTS

EP           0822718        2/1998
(Continued)

OTHER PUBLICATIONS

Milan Milenkovic, Oct. 1998, "Delivering Interactive Services Via a Digital TV Infrastructure", IEEE Multimedia, vol. 5, No. 4, pp. 34-43.

(Continued)

*Primary Examiner* — Annan Q Shang
*Assistant Examiner* — Reuben M Brown
(74) *Attorney, Agent, or Firm* — Robert D. Shedd; Joseph J. Opalach; Reitseng Lin (57) ABSTRACT

A video processing apparatus may be controlled in response to selecting an advertisement displayed in connection with a productivity or communication application software program being operated on a video processing apparatus. The advertisement includes control information, which is used by the video processing apparatus to control an operating mode thereof. The control information may include both time and channel data as well as a recording data for programming a timer. Alternately, the control information may only include program data, which is passed to the electronic program guide to determine the time and channel information associated with the program data.

9 Claims, 5 Drawing Sheets

U.S. PATENT DOCUMENTS

| | | | |
|---|---|---|---|
| 5,809,242 A | 9/1998 | Shaw et al. | |
| 5,940,073 A | 8/1999 | Klosterman et al. | |
| 6,009,410 A * | 12/1999 | LeMole et al. | 705/14 |
| 6,049,333 A * | 4/2000 | LaJoie et al. | 715/718 |
| 6,101,535 A * | 8/2000 | Hussmann et al. | 709/217 |
| 6,177,931 B1 * | 1/2001 | Alexander et al. | 725/52 |
| 6,367,080 B1 | 4/2002 | Enomoto et al. | |
| 6,606,128 B2 * | 8/2003 | Hanafee et al. | 348/563 |
| 7,212,249 B1 * | 5/2007 | Casement et al. | 348/564 |
| 7,225,142 B1 * | 5/2007 | Apte et al. | 705/14 |
| 2002/0129366 A1 * | 9/2002 | Schein et al. | 725/43 |
| 2005/0138660 A1 * | 6/2005 | Boyer et al. | 725/58 |
| 2005/0251824 A1 * | 11/2005 | Thomas et al. | 725/42 |
| 2005/0273819 A1 * | 12/2005 | Knudson et al. | 725/58 |
| 2006/0010469 A1 * | 1/2006 | Reynolds et al. | 725/39 |
| 2006/0015906 A1 * | 1/2006 | Boyer et al. | 725/51 |
| 2007/0162937 A1 * | 7/2007 | Casement et al. | 725/58 |

FOREIGN PATENT DOCUMENTS

| | | |
|---|---|---|
| FR | 2726717 | 5/1996 |
| JP | 10-126706 | 5/1998 |
| JP | 10-243364 | 9/1998 |
| JP | 10-276161 | 10/1998 |
| WO | WO 97/42763 | 11/1997 |
| WO | 98/17064 | 4/1998 |
| WO | WO 98/17064 | 4/1998 |
| WO | 98/56172 | 12/1998 |
| WO | WO 98/56172 | 12/1998 |

OTHER PUBLICATIONS

Search Report for Australian Appln. No. 23828/00 dated Sep. 19, 2002.

* cited by examiner

METHOD FOR SELECTING A PROGRAM DISPLAYED IN AN ADVERTISEMENT IN AN APPLICATION SOFTWARE PROGRAM

This application claims the benefit of U.S. provisional application Ser. No. 60/114,077 filed Dec. 28, 1998, which is hereby incorporated herein by reference, and which claims the benefit under 35 U.S.C. §365 of International Application PCT/US99/30761, filed Dec. 22, 1999, which was published in accordance with PCT Article 21(2) on Jul. 6, 2000 in English.

FIELD OF INVENTION

This invention generally relates to a method for operating a video processing apparatus in response to selecting an advertisement, or the like, which is displayed in connection with a productivity or communication application software program.

BACKGROUND OF INVENTION

Electronic Program Guides (EPGs) allow viewers to select any channel at any time during some period into the future, e.g., up to seven days forward. (The data associated with the EPG is typically broadcast in connection with a specified television channel at a certain time during the day.) Once a particular program is selected, for example, by highlighting, the viewer can perform audio/video processing like functions pertaining to that selected program. For instance, the viewer could instantly switch to that program if it is currently being aired or initiate a one-touch videocassette recording (VCR) if the television is properly configured and connected to a recording device.

A communication application software program, such as electronic mail ("e-mail") or electronic instant messaging, running on a computer connected by a network, such as, the Internet, permits a user to send and receive electronic messages to and from another user/computer. Proprietary "on-line" networks usually provide such services to users for a monthly fee. Some on-line services display advertisements within the context of the communication application software program. Similar to advertisements on a typical "web-page", these advertisements may be selected to obtain more information concerning a product or service. Selection of an advertisement usually connects the user to the web-page associated with the manufacturer of the product or the provider of the service.

There is consequently a need in the art for a convenient way to permit operation of an audio/video processing apparatus in response to the selection of an advertisement, for a particular television program or movie, that is displayed in connection with a productivity or communication application software program.

SUMMARY OF THE INVENTION

The present invention resides, in part, in recognition of the described problem and, in part, in providing a solution thereto. The present invention provides a convenient way of permitting a video processing apparatus, such as a television, VCR, DVD, satellite receiver, set-top box, or the like, to be controlled in response to an advertisement displayed in connection with a productivity or communication application software program. The productivity or communication application software program is operated on the video processing apparatus and, usually, connected to a network, such as the Internet. Control information associated with the advertisement is used to operate the video processing apparatus in a typical video operating mode. The present invention links the traditional functions of a video processing apparatus with those of a personal computer.

Generally, the present invention defines a method for operating a video processing apparatus. The method comprises operating a computer software program, such as, a productivity or communication application, on the video processing apparatus. An advertisement associated with a broadcast or transmitted television program is received in connection with the computer software program; the advertisement is displayed. The video processing apparatus is operated in a video-operating mode in response to selecting an advertisement. This invention is applicable with any program transmission means, for example, terrestrial, cable, satellite or the like.

DETAILED DESCRIPTION

Although the present invention is conveniently described in terms of a television apparatus, it is apparent to one skilled in the art that the present invention is applicable to any video processing apparatus that is capable of running a productivity or communication application software program and can generate or control a display device, for example, a VCR, DVD, satellite receiver, set-top box or the like.

Figure 1:
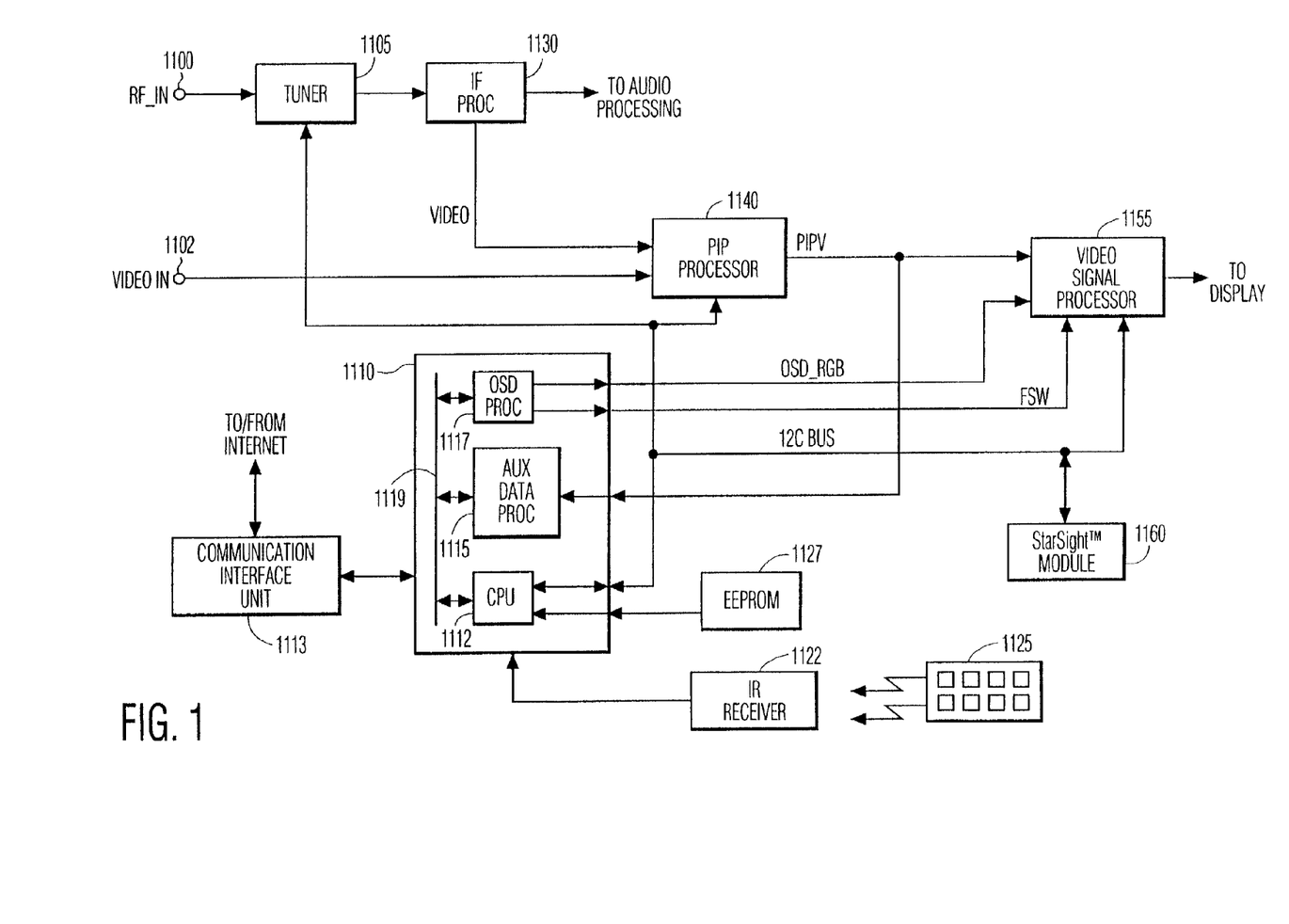
FIG. 1 shows an example of a television system in accordance with the present invention.

The television receiver shown in FIG. 1 is capable of processing both analog NTSC television signals and Internet information. Descriptions of the remaining well-known functions of the television receiver shown in FIG. 1 are not provided except where necessary for understanding the present invention. Tuner 1105 and IF processor 1130 operate in a conventional manner for tuning and demodulating a particular television signal that is included in signal RF_IN. The system shown in FIG. 1 also includes a main microprocessor 1110 for controlling components of the television receiver such as tuner 1105, picture-in-picture processing unit 1140, video signal processor 1155, and Gemstar® data processing module 1160.

Main microprocessor 1110 also controls the operation of a communications interface unit 1113 for providing the capability to upload and download information to and from the Internet. Communication interface unit 1113 includes, for example, a modem for connecting to an Internet service provider, e.g., via a telephone line or via a cable television line. The communication capability allows the system shown in FIG. 1 to provide electronic message capability and Internet related features such as web browsing in addition to receiving television programming. The electronic message capability is provided using an e-mail program running on microprocessor 1110, which permits connection to the Internet. CPU 1112 controls functions included within microprocessor 1110, for example, auxiliary data processor 1115 and on-screen display (OSD) processor 1117. Auxiliary data processor 1115 extracts auxiliary data such as Gemstar® data from video signal PIPV.

Gemstar® data, which provides program guide data (e.g., EPG) information in a known format, is typically received only on a particular television channel and the television receiver must tune that channel to extract Gemstar® data usually during a time period when the television receiver is typically not in use (e.g., 2:00 AM). At that time, CPU 1112 configures decoder 1115 such that auxiliary data is extracted from horizontal line intervals such as line 16 that are used for Gemstar® data. For an EPG display, the display data included in the EPG display is produced by OSD processor 1117 and included in the output signal by VSP 1155 in response to fast switch signal FSW.

An exemplary embodiment of the features of the system shown in FIG. 1 that have been described thus far comprises an ST9296 microprocessor produced by SGS-Thomsom Microelectronics; an M65616 picture-in-picture processor produced by Mitsubishi; and an LA7612 video signal processor produced by Sanyo.

Figure 2:
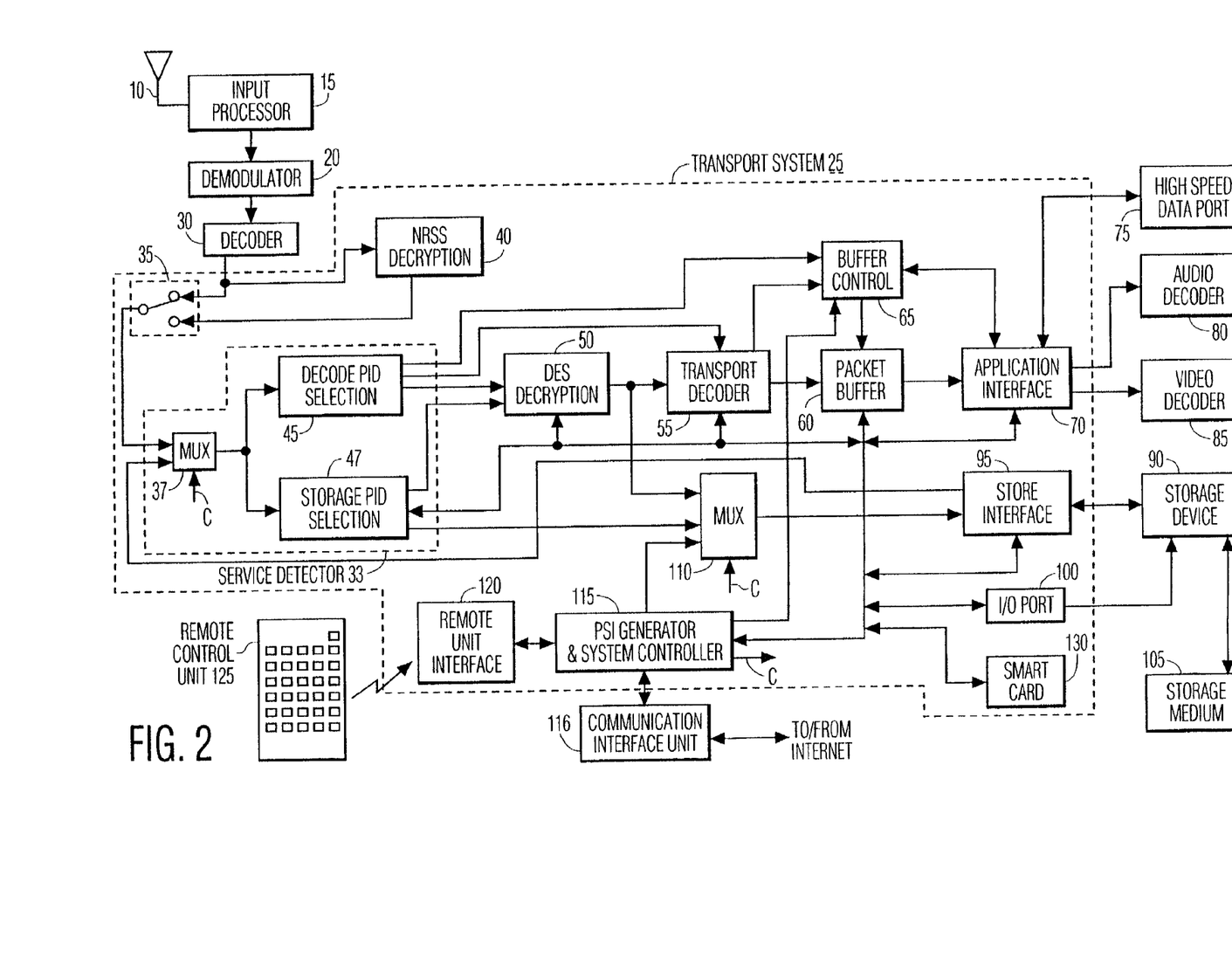
FIG. 2 shows an example of a digital video processing apparatus in accordance with the present invention.

FIG. 2 is an MPEG compatible system for receiving MPEG encoded transport streams representing broadcast programs and is also capable of processing Internet information, including electronic messages. User interface systems are also applicable to other types of digital signal processing devices including non-MPEG compatible systems, involving other types of encoded datastreams (e.g., digital video disc (DVD) systems). The exemplary system described below is described as processing broadcast programs. The term 'program' is used to represent any form of packetized data such as telephone messages, computer programs, Internet data, audio presentations (e.g., from a remote source or from a local source), visual presentations, audiovisual presentations (e.g., from a remote source or a local source), or other communications. Descriptions of the remaining well-known functions of the television receiver shown in FIG. 2 are not provided except where necessary for understanding the present invention.

A carrier modulated with video data is received by antenna 10 and processed by input processor unit 15. The resultant digital output signal is demodulated by demodulator 20 and decoded by decoder 30. The output from decoder 30 is processed by transport system 25, which provides compressed data outputs for storage, further decoding, or communication to other devices. Video and audio decoders 85 and 80 respectively, decode the compressed data from system 25 to provide outputs for display.

The data provided to mux 37 from selector 35 is in the form of an MPEG compliant packetized transport datastream as defined in MPEG systems standard section 2.4 and includes program guide information and the data content of one or more program channels. Packet Identifiers (PIDs) identify the individual packets that comprise particular program channels. The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to audio and video decoders 80 and 85 and high speed data port 75.

In addition, controller 115 is coupled to a communication interface unit 116 that operates in a manner similar to interface unit 1113 of FIG. 1. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 2 to provide electronic message capability and Internet related features such as web browsing in addition to receiving television programming. The electronic message capability is provided using an e-mail program running on microprocessor 115, which permits connection to the Internet.

Typically, however, the computer-related programs and operations, (such as, e-mail) are implemented independently of the television programs and operations. That is, composing, reading and/or sending e-mail is performed independent of any video processing operation, for example, tuning, recording, and/or replaying of audio, video, or television programs. Likewise, the audio, video, or television programming, tuning, recording and/or replaying is performed independent of the computer-related program that may be running on the digital television.

Figure 3:
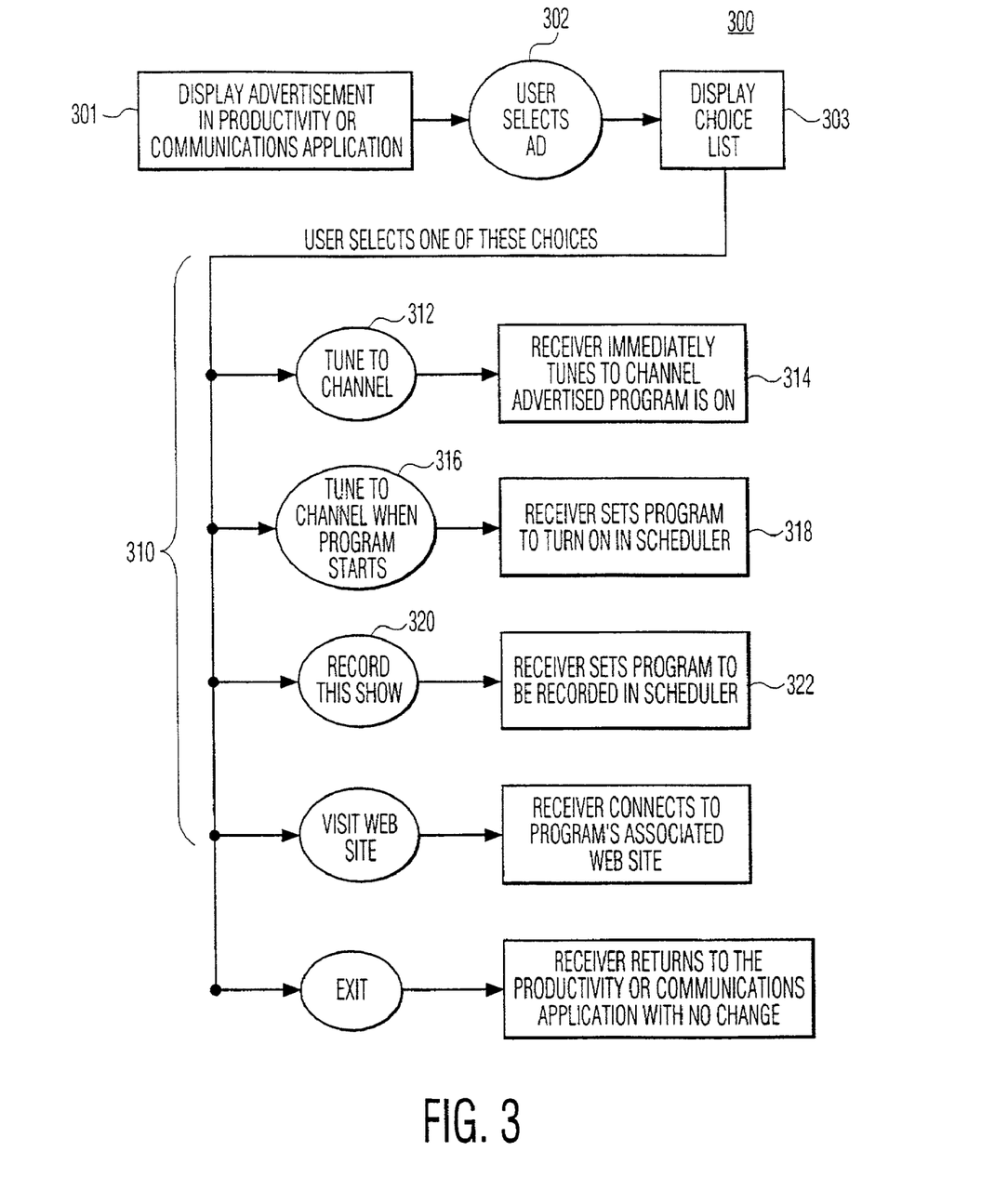
FIG. 3 shows a software block diagram in accordance with the present invention.

FIG. 3 is a software block diagram or flow chart of an exemplary program which, according to the present invention, may be executed by controller 1110 of FIG. 1, controller 115 of FIG. 2, or any other suitably programmed control arrangement of an electronic host device. The term "electronic host device" as used herein is not limited to television receivers, video recording devices or set-top boxes, but rather encompasses hybrids thereof (e.g., PCTVs), satellite television and/or data signal converters, program guide receiver units, and the like, regardless of whether incorporated into a television receiver or personal computer or connected externally thereto. The exemplary program will be described below only with respect to the exemplary hardware implementation of an electronic host device shown in FIG. 1.

According to the exemplary program 300, an advertisement for a program is presented within the display of a communication or productivity application software program 301. In response to a user's selection 302 of a displayed advertisement, a list of choices 310 may be provided. Alternatively, the receiver could operate based on a default mode, for example, immediately selecting the channel with the advertised program, or in response to the user desiring to record the program advertised (perhaps by activating a RECORD button), immediately set up a one-touch recording.

If the choice list is shown, the user selects one of the choices, and the receiver responds correspondingly. For example, if the choice is to tune to a channel 312, the receiver will immediately tune to the subject channel. This may be achieved by either presenting the video in a small window and the user may continue to use the application software program, or the video will take up the entire screen and the user must actively return to the application. The user's work is automatically saved regardless of the selected choice. Alternatively, a dialog box may appear asking the user whether to save the current work or not.

Another choice would be to control the receiver to tune to the subject channel just prior to the start of the program 316 and 318. Alternately, the user could choose to record the program 320. This would result in programming a timer, for example, in the television or the video recording apparatus 322.

Figure 4:
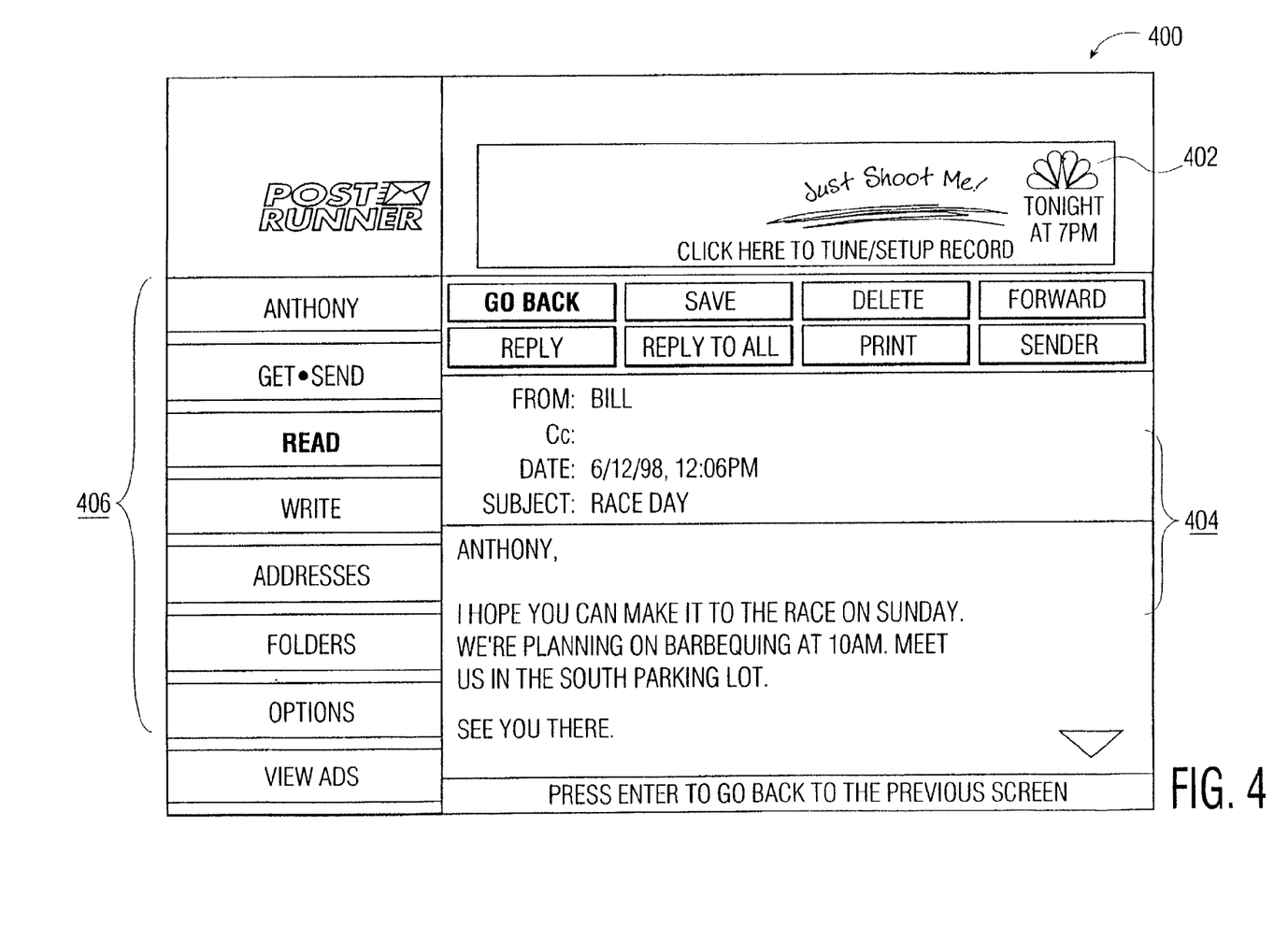
FIG. 4 shows an electronic message display according to an implementation of the present invention.

In accordance with the present invention, the computer application software program, for example, a productivity or communication application is operated in a video processing apparatus, such as a television, VCR, DVD or the like. A user selects an advertisement (or possibly an icon associated therewith) that is displayed within the context of computer application software program. FIG. 4 illustrates one such communication application software program, i.e., an electronic mail message program 400. Electronic mail message program 400 is operated on a video processing apparatus, for example, the television receiver of FIG. 1 or 2, or any other appropriate video processing apparatus. Other electronic messaging programs, for example, instant messaging, may also be employed with the present invention. Further, productivity application software programs, such as, word processing, spreadsheets or the like, may also be employed with the present invention.

An advertisement 402 is displayed within an area of electronic mail message program display 400. A typical electronic message display 400 includes fields 404 for the SENDER, the RECIPIENT, the SUBJECT and the body of the MESSAGE. In addition, display 400 also include ICONs 406, which can be selected to invoke certain functions, such as, SEND a message, READ a message, view the user's ADDRESS BOOK, etc.

Upon selection of the advertisement 402, the video processor receives the data (i.e., advertisement data) associated with the advertisement. This advertisement data may include program start time, program end time, program duration; the channel via which the program is transmitted, and characteristic information, and combinations thereof. Examples of the characteristic information include program title, program theme, program category, program keywords, a program description, program type (e.g. audio, video, audiovisual, computer, Internet, and the like), and program repeat frequency (e.g., once per week, daily, etc.).

Figure 5:
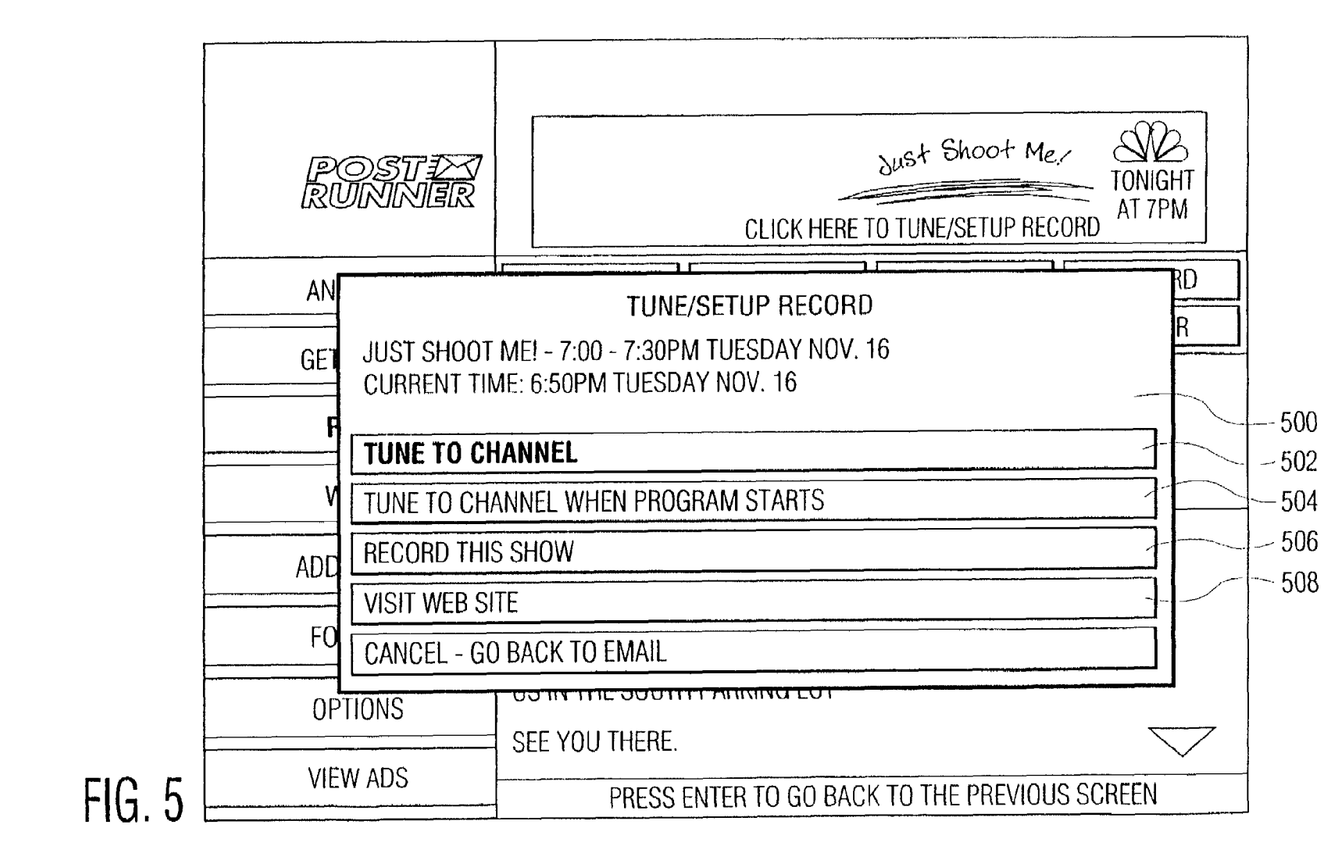
FIG. 5 shows a subsequent electronic message display in accordance with the present invention.

FIG. 5 shows an optional and subsequent display of the communication application program of FIG. 4 in response to the user's selection of advertisement 402. FIG. 5 illustrates an embodiment of a user selection display 500 in which the user is presented with certain options that may be selected. For example, the user may choose to now tune to the channel that the program will be broadcast on 502. Alternately, the user may choose to automatically tune to that channel when the program starts 504 or program a recording timer to establish a recording event 506. Further, the user may select to visit an appropriate web site 508 related to the selected advertisement. The display of FIG. 5 may not be produced; upon selection of advertisement 402, the video processing apparatus may either directly tune to the appropriate channel or set-up a recording event without further user intervention.

Thus, the video processing apparatus can now be operated in a video-operating mode, for example, automatically selecting a channel, in response to the advertisement data if it is currently being aired. Alternately, if the program is not currently available, the video processing apparatus may be operated to set-up to automatically record the program in the future. This may be achieved by setting-up a "one-touch recording" operating mode or by programming timers with the CHANNEL and TIME information. If the advertisement data only contains "program information", such as the name of the program, then the data can be processed by the electronic program guide to determine the CHANNEL and TIME information.

One touch recording involves setting up a programmed event in the video processing apparatus that receives the electronic program guide, usually, the television. At the appropriate time, the television controls the recording device. The invention also embraces the concept of conflict management. That is, if the selection of an advertisement results in the setting up of a one-touch recording which may conflict with an existing programmed event in the recording device, the system must be able to resolve the conflict. One possible outcome is that the most recent desires of the user, i.e., the selection of the advertisement overrides the existing programmed event. Another option wold be to indicate the conflict to the user when the advertisement is selected, thereby allowing the user an opportunity to resolve the conflict.

While the present invention finds much usefulness in the realm of electronic host devices, which are connected to or defined by a television set, the present invention is not limited to such electronic host devices. The present invention may be implemented, for example, with a computer as the electronic host device. This invention may also be employed with advertisements for programs that are displayed in connection with web browsers. It is to be understood that the embodiments and variations shown and described herein are for illustrations only and that those skilled in the art by implement various modifications without departing from the scope and spirit of the invention.

The invention claimed is:

1. A method for operating a video processing apparatus, said video operating apparatus being capable of operating in a video operating mode, and in a computer program operating mode, said video processing apparatus having an electronic program guide operable in said video operating mode and not in said computer program operating mode, said method comprising the steps of:

operating said video processing apparatus in said computer program operating mode by running a computer application software program on said video processing apparatus, said computer application software program providing a display;

causing an advertisement associated with a broadcast television program specified by a service provider to be displayed in an area of said display while said computer application software program is running;

receiving a signal indicating user selection of said advertisement while said computer application software program is running; and providing a user selection display in response to said user selection of said advertisement, said user selection display being provided while said computer application software program is running and comprising a listing of a plurality of user selectable options associated with said broadcast television program, wherein at least one of said plurality of user selectable options, which when selected, causes said video processing apparatus to switch from said computer program operating mode to said video operating mode and wherein said plurality of user selectable options includes a first option which when selected causes said video processing apparatus to immediately tune to a channel in which said broadcast television program is on, a second option which when selected causes said video processing apparatus to tune to said channel in which said broadcast television program is on when said broadcast television program starts, a third option which when selected causes said video processing apparatus to program a recording timer to record said broadcast television program, a fourth option which when selected causes said video processing apparatus to access a web site associated with said broadcast television program, and a fifth option which when selected causes said video processing apparatus to return to said computer application software program, and further wherein said video processing apparatus causes a user's work in said computer application software program to be saved in response to selection of at least one of said plurality of user selectable options.

2. The method of claim 1, wherein said computer application software program is one of a productivity and communication application software program.

3. The method of claim 2 wherein said advertisement comprises control information associated therewith, said control information, when received by a video processor, causes the video processor to operate in accordance with said control information, said control information comprising at least one of (1) time and channel selection data and (2) recording data.

4. The method of claim 3 wherein said control information comprises program data, and wherein time and channel data is determined using said electronic program guide in response to said program data.

5. A method for operating a video processing apparatus having a video operating mode and a computer program operating mode, said method comprising the steps of:

operating said video processing apparatus in said computer program operating mode by running a computer application software program on said video processing apparatus, said computer application software program being one of an electronic mail message program, an instant messaging program, a web browser and a productivity application software program, said computer application software program providing a display, wherein said video processing apparatus includes an electronic program guide operable in said video operating mode and not in said computer program operating mode;

causing an advertisement associated with a broadcast television program specified by a service provider to be displayed in an area of said display while said computer application software program is running;

receiving a signal indicating user selection of said advertisement while said computer application software program is running; and providing a user selection display in response to said user selection of said advertisement, said user selection display being provided while said computer application software program is running and comprising a listing of a plurality of user selectable options associated with said broadcast television program, wherein at least one of said plurality of user selectable options, which when selected, causes said video processing apparatus to switch from said computer program operating mode to said video operating mode and wherein said plurality of user selectable options includes a first option which when selected causes said video processing apparatus to immediately tune to a channel in which said broadcast television program is on, a second option which when selected causes said video processing apparatus to tune to said channel in which said broadcast television program is on when said broadcast television program starts, and a third option which when selected causes said video processing apparatus to program a recording timer to record said broadcast television program, a fourth option which when selected causes said video processing apparatus to access a web site associated with said broadcast television program, and a fifth option which when selected causes said video processing apparatus to return to said computer application software program, and further wherein said video processing apparatus causes a user's work in said computer application software program to be saved in response to selection of at least one of said plurality of user selectable options.

6. The method of claim 5, wherein said computer application software program is an electronic messaging program.

7. The method of claim 5, wherein said productivity application software program is one of a word processing program and a spreadsheet program.

8. A video processing apparatus having a video operating mode and a computer program operating mode, said video processing apparatus comprising:

means for operating said video processing apparatus in said computer program operating mode by running a computer application software program on said video processing apparatus, said computer application software program being one of an electronic mail message program, an instant messaging program, a web browser and a productivity application software program, said computer application software program providing a display, wherein said video processing apparatus includes an electronic program guide operable in said video operating mode and not in said computer program operating mode;

means for enabling an advertisement associated with a broadcast television program specified by a service provider to be displayed in an area of said display while said computer application software program is running;

means for receiving a signal indicating user selection of said advertisement while said computer application software program is running; and wherein, in response to said user selection of said advertisement, a user selection display is provided while said computer application software program is running, said user selection display comprising a listing of a plurality of user selectable options associated with said broadcast television program, and wherein at least one of said plurality of user selectable options, which when selected, causes said video processing apparatus to switch from said computer program operating mode to said video operating mode, and wherein said plurality of user selectable options includes a first option which when selected causes said video processing apparatus to immediately tune to a channel in which said broadcast television program is on, a second option which when selected causes said video processing apparatus to tune to said channel in which said broadcast television program is on when said broadcast television program starts, and a third option which when selected causes said video processing apparatus to program a recording timer to record said broadcast television program, a fourth option which when selected causes said video processing apparatus to access a web site associated with said broadcast television program, and a fifth option which when selected causes said video processing apparatus to return to said computer application software program, and further wherein said video processing apparatus causes a user's work in said computer application software program to be saved in response to selection of at least one of said plurality of user selectable options.

9. The video processing apparatus of claim 8, wherein said productivity application software program is one of a word processing program and a spreadsheet program.

* * * * *